United States Patent
Ring et al.

(10) Patent No.: US 9,688,886 B2
(45) Date of Patent: Jun. 27, 2017

(54) HEAT-ACTIVABLE AND CROSSLINKABLE ADHESIVE TAPE FOR BONDING ELECTRONIC COMPONENTS AND CONDUCTOR TRACKS

(75) Inventors: Christian Ring, Hamburg (DE); Thorsten Krawinkel, Hamburg (DE)

(73) Assignee: TESA SE, Norderstedt (DE)

( * ) Notice: Subject to any disclaimer, the term of this patent is extended or adjusted under 35 U.S.C. 154(b) by 450 days.

(21) Appl. No.: 11/169,124

(22) Filed: Jun. 28, 2005

(65) Prior Publication Data

US 2005/0288436 A1    Dec. 29, 2005

(30) Foreign Application Priority Data

Jun. 28, 2004 (DE) .................. 10 2004 031 189

(51) Int. Cl.
  *C09J 7/00* (2006.01)
  *C09J 153/02* (2006.01)
(52) U.S. Cl.
  CPC ............. *C09J 7/00* (2013.01); *C09J 153/025* (2013.01); *C09J 2453/00* (2013.01)
(58) Field of Classification Search
  CPC ............................... C08L 2666/02; C09J 7/00
  USPC .......................................................... 525/89
  See application file for complete search history.

(56) References Cited

U.S. PATENT DOCUMENTS

| | | | | |
|---|---|---|---|---|
| 4,113,981 A | | 9/1978 | Fujita et al. ................ 174/88 R |
| 4,606,962 A | | 8/1986 | Reylek et al. ................. 428/148 |
| 5,089,558 A | * | 2/1992 | Hall et al. ........................ 525/89 |
| 5,229,464 A | | 7/1993 | Erickson et al. ............. 525/314 |
| 5,300,340 A | | 4/1994 | Calhoun et al. ................ 428/40 |
| 5,369,167 A | | 11/1994 | Pottick et al. .................. 525/65 |
| 5,478,885 A | | 12/1995 | Masse et al. ................... 525/92 |
| 5,843,251 A | * | 12/1998 | Tsukagoshi et al. ........... 156/64 |
| 6,180,719 B1 | * | 1/2001 | Miyata .......................... 525/108 |
| 6,294,270 B1 | | 9/2001 | Clough .......................... 428/620 |
| 6,423,367 B2 | | 7/2002 | Clough ............................ 427/58 |
| 6,489,042 B2 | | 12/2002 | Imken et al. ................. 428/620 |
| 6,541,553 B1 | | 4/2003 | Erickson et al. |
| 2002/0037965 A1 | * | 3/2002 | Kinoshita et al. ............ 525/127 |
| 2002/0155286 A1 | | 10/2002 | Kobayashi et al. |

FOREIGN PATENT DOCUMENTS

| | | |
|---|---|---|
| DE | 198 53 805 A1 | 5/2000 |
| DE | 692 32 787 T2 | 4/2003 |
| DE | 103 24 737 A1 | 12/2003 |
| DE | 102 58 961 A1 | 7/2004 |
| EP | 0 658 603 A2 | 6/1995 |
| EP | 06 58 603 A2 | 6/1995 |
| EP | 1 548 078 A1 | 6/2005 |
| JP | 57 149369 | 9/1982 |
| JP | 58-17160 | 1/1983 |
| WO | WO 98/22531 | 5/1998 |
| WO | WO 00/01782 A1 | 1/2000 |

OTHER PUBLICATIONS

European Search Report.
Patent Abstracts of Japan Publication No. 06-2 79 538 A—Otsuka Yoshihiro; Epoxy-modified block polymer and thermoplastic polymer composition containing epoxy-modified block polymer; Oct. 4, 1994.
Patent Abstract of Japan Publication No. 06-2 63 820 A—Otsuka Yoshihiro; "Block copolymer, composition thereof, and its production"; Sep. 20, 1994.
Extrusion International Online, www.battenfeld-cincinnati.com, Verlag, Cologne, Germany, Feb. 2015, p. 45.

* cited by examiner

*Primary Examiner* — Megan McCulley
(74) *Attorney, Agent, or Firm* — Norris McLaughlin & Marcus, P.A.

(57) ABSTRACT

Heat-activable adhesive tape for bonding electronic components and conductor tracks, with an adhesive composed at least of:
a) an acid-modified or acid-anhydride-modified vinylaromatic block copolymer and
b) an epoxidized vinylaromatic block copolymer.

14 Claims, No Drawings

HEAT-ACTIVABLE AND CROSSLINKABLE ADHESIVE TAPE FOR BONDING ELECTRONIC COMPONENTS AND CONDUCTOR TRACKS

The invention relates to a heat-activable adhesive of low fluidity and without volatile substances for use in electronic components and conductor tracks.

For the production of electronic components and especially printed conductor tracks (FPCBs, flexible printed circuit boards) adhesive tapes are nowadays used which are subject to very exacting requirements.

Flexible printed circuit boards are employed in a multiplicity of electronic devices such as mobile phones, radios, computers, printers and many more. They are constructed from layers of copper and a high-melting resistant thermoplastic: mostly polyimide, less often polyester. These FPCBs are produced using particularly strong adhesive tapes. On the one hand, for producing the FPCBs, the copper foils are bonded to the polyimide films; on the other hand, individual FPCBs are also bonded to one another, in which case polyimide bonds to polyimide. In addition to these applications, the FPCBs are also bonded to other substrates.

Since very high bond performances must be attained in the case of bonding tasks such as these, the adhesive tapes used are generally heat-activable tapes, which are processed at high temperatures. These adhesive tapes must not emit volatile constituents in the course of this high temperature load during the bonding of the FPCBs, which often takes place at temperatures around 200° C., since this may otherwise lead to blistering. In order to achieve a high level of cohesion the adhesive tapes ought to crosslink during this temperature load. High pressures during the bonding operation make it necessary for the flowability of the adhesive tapes at high temperatures to be low. This is achieved by high viscosity in the uncrosslinked adhesive tape or by rapid crosslinking. Moreover, the adhesive tapes must also be solder bath resistant, in other words must for a short time withstand a temperature load of 288° C.

For this reason the use of pure thermoplastics is not rational, despite the fact that they melt very readily, ensure effective wetting of the bond substrates and lead to very rapid bonding within a few seconds. At high temperatures, though, they are so soft that they tend to swell out of the bondline under pressure in the course of bonding. Accordingly there is no solder bath resistance either.

For crosslinkable adhesive tapes it is usual to use epoxy resins or phenolic resins, which react with specific hardeners to form polymeric networks. In this specific case the phenolic resins cannot be used, since in the course of crosslinking they generate elimination products, which are released and, in the course of curing or, at the latest, in the solder bath, lead to blistering.

Epoxy resins are employed primarily in structural adhesive bonding and, after curing with appropriate crosslinkers, produce very brittle adhesives, which indeed achieve high bond strengths but possess virtually no flexibility.

Increasing the flexibility is vital for use in FPCBs. On the one hand the bond is to be made using an adhesive tape which ideally is wound onto a roll; on the other hand the conductor tracks in question are flexible, and must also be bent, readily apparent from the example of the conductor tracks in a laptop, where the foldable screen is connected via FPCBs to the further circuits.

Flexibilizing these epoxy resin adhesives is possible in two ways. First, there exist epoxy resins flexibilized with elastomer chains, but the flexibilization they experience is limited, owing to the very short elastomer chains. The other possibility is to achieve flexibilization through the addition of elastomers, which are added to the adhesive. This version has the drawback that the elastomers are not crosslinked chemically, meaning that the only elastomers that can be used are those which at high temperatures still retain a high viscosity.

Because the adhesive tapes are produced generally from solution it is frequently difficult to find elastomers of a sufficiently long-chain nature not to flow at high temperatures while being still of a sufficiently short-chain nature that they can be brought into solution.

Production via a hotmelt operation is possible but very difficult in the case of crosslinking systems, since it is necessary to prevent premature crosslinking during the production operation.

The prior art further discloses, in WO 00/01782 A1, an electrically conductive, thermoplastic and heat-activable adhesive sheet comprising i) a thermoplastic polymer, with a fraction of from 30% to 89.9% by weight,
ii) one or more tackifying resins, with a fraction of from 5% to 50% by weight, and/or
iii) epoxy resins with hardeners, possibly accelerators as well, with a fraction of from 5% to 40% by weight,
iv) silverized glass beads or silver particles, with a fraction of from 0.1% to 40% by weight.

A development was disclosed by DE 198 53 805 A1, with the electrically conductive, thermoplastic and heat-activable adhesive sheet comprising i) a thermoplastic polymer, with a fraction of at least 30% by weight,
ii) one or more tackifying resins, with a fraction of from 5% to 50% by weight, and/or
iii) epoxy resins with hardeners, possibly also accelerators, with a fraction of from 5% to 40% by weight,
iv) metallized particles, with a fraction of from 0.1% to 40% by weight,
v) non-deformable or difficult-to-deform spacer particles, with a fraction of from 1% to 10% by weight, which do not melt at the bonding temperatures of the adhesive sheet.

In preferred embodiments the thermoplastic polymers are in each case thermoplastic polyolefins, polyesters, polyurethanes or polyamides or modified rubbers, such as nitrile rubbers in particular.

It is an object of the invention, therefore, to provide an adhesive tape which is heat-activable, crosslinks in the heat, does not comprise any volatile constituents, possesses a low viscosity in the heat, displays effective adhesion to polyimide and in the uncrosslinked state is soluble in organic solvents.

This object is achieved, surprisingly, by means of an adhesive tape as described hereinbelow.

The invention accordingly provides an adhesive tape for bonding electronic components and conductor tracks, comprising an adhesive composed at least of an acid-modified or acid-anhydride-modified vinylaromatic block copolymer and an epoxidized vinylaromatic block copolymer.

The general expression "adhesive tape" for the purposes of this invention embraces all sheetlike structures, such as two-dimensionally extended sheets or sheet sections, tapes with extended length and limited width, tape sections, diecuts and the like.

An advantage of the adhesives of the invention is that there are no constituents of low molecular mass which are volatile at high temperature and which in the course of adhesive bonding at 200° C. or later on, in the course of solder bath treatment, lead to gas bubbles which adversely affect the bond performance. As a result of the fact that two elastomers crosslink with one another there is no need to add further low molecular mass crosslinkers or hardeners such as epoxy resins or amines.

Epoxidized block copolymers are described in U.S. Pat. No. 5,478,885 A and U.S. Pat. No. 5,229,464 A. These are not pure vinylaromatic block copolymers. Although vinylaromatics may be incorporated in the end blocks, at least a fraction of non-aromatic diolefins is incorporated in the outer blocks. The block copolymers described also have only very short blocks.

Crosslinked compositions of epoxy resins and epoxide-modified vinylaromatic block copolymers are described in EP 0658603A1. They are not, however, used as adhesives, and there is also no crosslinking with an acid-anhydride-modified vinylaromatic block copolymer.

Functionalized elastomers, including those functionalized with epoxides, are described in WO 98/22531 A1. The functionalized elastomers do not contain block copolymers.

U.S. Pat. No. 6,294,270 B, U.S. Pat. No. 6,423,367 B and U.S. Pat. No. 6,489,042 B describe crosslinkable mixtures of epoxidized vinylaromatic block copolymers and epoxy resins for utilities including their use in electronic components, and also including their use as an adhesive for bonding two electrical components. In that case the use of a further epoxy resin is mandatorily prescribed, and low molecular mass hardeners are needed as well.

Crosslinkable, acid-anhydride-modified block copolymers in adhesives are described in U.S. Pat. No. 5,369,167 A, JP 57/149369 A1 and JP 58/017160 A1. However, low molecular mass resins are added in each case and there is no mention of adhesive tapes.

Elastomers employed in the present invention are preferably those based on block copolymers comprising polymer blocks predominantly formed of vinylaromatics (A blocks), preferably styrene, and those predominantly formed by polymerization of 1,3-dienes (B blocks), preferably butadiene and isoprene. Not only homopolymer but also copolymer blocks are useful in accordance with the invention. Resultant block copolymers may contain identical or different B blocks, which may be partly, selectively or fully hydrogenated. Block copolymers may have a linear A-B-A structure. Likewise suitable for use are block copolymers of radial design and also star-shaped and linear multiblock copolymers. Further components which may be present include A-B diblock copolymers. All of the aforementioned polymers may be utilized alone or in a mixture with one another. At least a fraction of the block copolymers employed must have been acid-modified or acid-anhydride-modified, the modification taking place principally through free-radical graft copolymerization of unsaturated monocarboxylic and polycarboxylic acids or anhydrides, such as, for example fumaric acid, itaconic acid, citraconic acid, acrylic acid, maleic anhydride, itaconic anhydride or citraconic anhydride, preferably maleic anhydride. The fraction of acid and/or acid-anhydride is preferably between 0.5 and 4 percent by weight, based on the overall block copolymer. Commercially such block copolymers are available for example under the name Kraton™ FG 1901 and Kraton™ FG 1924 from Shell, or Tuftec™ M 1913 and Tuftec™ M 1943 from Asahi.

At least one further block copolymer must be in epoxidized form, the modification taking place by oxidative epoxidization of the double bonds in the soft block fraction. The epoxide equivalent is preferably between 200 and 4000, more preferably between 500 and 2500.

Block copolymers of this kind are available commercially for example under the name Epofriend™ A 1005, A 1010 or A 1020 from Daicel.

Besides the acid-modified or acid-anhydride-modified vinylaromatic block copolymers already mentioned it is also possible to add further elastomers. Besides non-modified block copolymers it is possible among others to use those based on pure hydrocarbons, for example unsaturated polydienes, such as natural or synthetic polyisopre or polybutadiene, elastomers which are essentially saturated chemically, such as saturated ethylene-propylene copolymers, α-olefin copolymers, polyisobutylene, butyl or rubber, ethylene-propylene rubber and also chemically functionalized hydrocarbons such as halogenated, acrylate-containing or vinyl-ether-containing polyolefins, for example, to name but a few.

Elastomers containing acid or acid anhydride groups, such as polyvinyl methyl ether-maleic anhydride copolymers, for example, which are obtainable for example under the name Gantrez™ 119, sold by the company ISP, can also be employed. The same applies to epoxidized elastomers.

In order to increase the adhesion it is also possible to add tackifier resins compatible with the elastomer block of the block copolymers, in which case care must be taken to ensure that these resins are not volatile at the corresponding crosslinking temperatures.

Examples of tackifiers which can be used in pressure-sensitive adhesives of the invention include non-hydrogenated, partially hydrogenated or fully hydrogenated resins based on rosin and rosin derivatives, hydrated polymers of dicyclopentadiene, non-hydrogenated or partially, selectively or fully hydrogenated hydrocarbon resins based on $C_5$, $C_5/C_9$ or $C_9$ monomer streams, polyterpene resins based on α-pinene and/or β-pinene and/or δ-limonene, hydrogenated polymers of preferably pure $C_8$ and $C_9$ aromatics. Aforementioned tackifier resins may be used either alone or in a mixture.

Further additives which can be used typically include:
primary antioxidants, such as sterically hindered phenols
secondary antioxidants, such as phosphites or thioethers
in-process stabilizers, such as C-radical scavengers
light stabilizers, such as UV absorbers or sterically hindered amines
processing assistants
endblock reinforcer resins
fillers, such as silicon dioxide, glass (ground or in the form of beads), aluminium oxides, zinc oxides, calcium carbonates, titanium dioxides, carbon blacks, metal powders, etc.
colour pigments and dyes and also optical brighteners.

An advantage of these systems is the very low softening temperature, which is a result of the softening point of the polystyrene in the endblocks of the block copolymers. Since the elastomers are incorporated into a polymeric network during the crosslinking reaction, and since this reaction is relatively fast at the high temperatures of up to 200° C. that are normally used for bonding FPCBs, there is no escape of adhesive from the bondline. By adding compounds known as accelerators it is possible to increase the reaction rate further.

Examples of possible accelerators include the following:
tertiary amines, such as benzyldimethylamine, dimethylaminomethylphenol and tris(dimethylaminomethyl) phenol
boron trihalide-amine complexes
substituted imidazoles triphenylphosphine Ideally the acid-modified and/or acid-anhydride-modified and epoxidized elastomers are employed in a proportion such that the molar fraction of epoxide groups and anhydride groups is just equivalent. The ratio between anhydride groups and epoxide groups, however, can be varied within wide ranges; for sufficient crosslinking, neither of the two groups should be present in more than a tenfold molar excess.

To produce the adhesive tape the constituents of the adhesive are dissolved in a suitable solvent, toluene for example, or mixtures of mineral spirit 60/90 and acetone, and the solution is coated onto a flexible substrate provided with a release layer, such as a release paper or release film, for example, and the coating is dried, so that the composition can be easily removed again from the substrate. Following appropriate converting, diecuts, rolls or other shapes can be produced at room temperature. Corresponding shapes are then adhered, preferably at elevated temperature, to the substrate to be bonded, polyimide for example.

It is also possible to coat the adhesive directly onto a polyimide backing. Adhesive sheets of this kind can then be used for masking copper conductor tracks for FPCBs.

It is not necessary for the bonding operation to be a one-stage process; instead, the adhesive tape can first be adhered to one of the two substrates by carrying out hot lamination. In the course of the actual hot bonding operation with the second substrate (second polyimide sheet or copper foil), the resin then fully or partly cures and the bondline reaches the high bond strength. The epoxide groups should preferably not yet enter into any chemical reaction at the lamination temperature, but instead should react only on hot bonding, with the acid or acid anhydride groups.

For special applications it is also possible to make the adhesive tapes electrically conducting, using methods as described, for example, in U.S. Pat. No. 3,475,213 A, U.S. Pat. Nos. 4,113,981 A, 4,606,962 A, U.S. Pat. No. 5,300,340 A, WO 00/01782 A1 or DE 198 53 805 A1.

Attention is drawn to the content of these publications, and the said content is part of this disclosure and invention.

EXAMPLES

The invention is described in more detail below by a number of examples, without restricting the invention in any way whatsoever.

Example 1

A mixture of 85% by weight of Kraton™ FG 1901 (maleic-anhydride-modified styrene-ethylene/butylene-styrne block copolymer containing 30% by weight of block polystyrene and about 2% by weight of maleic anhydride) and 15% by weight of Epofriend™ A 1010 (epoxidized styrene-butadiene-styrene block copolymer containing 40% by weight of block polystyrene) is dissolved in toluene and coated from solution onto a release paper, siliconized with 1.5 g/m$^2$, and dried at 110° C. for 15 minutes. The thickness of the adhesive layer is 25 µm.

Comparative Example 2

A mixture of 80% by weight of Kraton™ G 1650 (non-modified styrene-ethylene/butylene-styrene block copolymer analogous to Kraton™ FG 1901), 15% by weight of Epofriend™ A 1010 (epoxidized styrene-butadiene-styrene block copolymer containing 40% by weight of block polystyrene) and 5% by weight of maleic anhydride is dissolved in toluene and coated from solution onto a release paper, siliconized with 1.5 g/m$^2$, and dried at 110° C. for 15 minutes. The thickness of the adhesive layer is 25 µm.

Comparative Example 3

A mixture of 85% by weight of Kraton™ FG 1901 (maleic-anhydride-modified styrene-ethylene/butylene-styrene block copolymer containing 30% by weight of block polystyrene and about 2% by weight of maleic anhydride) and 12% by weight of Kraton™ D 1102 (styrene-butadiene-styrene block copolymer containing 30% by weight of block polystyrene) and 3% by weight of Bakelite EPR™ 161 (epoxy resin) is dissolved in toluene and coated from solution onto a release paper, siliconized with 1.5 g/m$^2$, and dried at 110° C. for 15 minutes. The thickness of the adhesive layer is likewise 25 µm.

Bond of FPCBs with the Adhesive Tape Produced

Two FPCBs were bonded using in each case one of the adhesive tapes produced in accordance with Examples 1 to 3. For this purpose the adhesive tape was laminated onto the polyimide sheet of the polyimide/copper foil FPCB laminate at 100° C. Subsequently a second polyimide sheet of a further FPCB was bonded to the adhesive tape and the whole assembly was compressed in a heatable Burkle press at 200° C. and a pressure of 1.5 MPa for one hour.

Test Methods

The properties of the adhesive sheets produced in accordance with the examples specified above were investigated by the following test methods.

T-Peel Test with FPCB

Using a tensile testing machine from Zwick, the FPCB/adhesive tape/FPCB assemblies produced in accordance with the process described above were peeled from one another at an angle of 180° and with a rate of 50 mm/min, and the force required, in N/cm, was measured. The measurements were made at 20° C. and 50% relative humidity. Each measurement value was determined three times.

Temperature Stability

In analogy to the T-peel test described, the FPCB assemblies produced in accordance with the process described above were suspended so that one side of the assembly was suspended while on the other side a weight of 500 g was attached. The static peel test takes place at 70° C. The parameter measured is the static peel travel in mm/h.

Solder Bath Resistance

The FPCB assemblies bonded in accordance with the process described above were laid for 10 seconds onto a solder bath which was at a temperature of 288° C. The bond was rated solder bath resistant if there was no formation of air bubbles which caused the polyimide sheet of the FPCB to inflate. The test was rated as failed if there was even slight formation of bubbles.

Results:

For adhesive assessment of the abovementioned examples the T-peel test was conducted first of all.

The results are given in Table 1.

TABLE 1

| | T-peel test [N/cm] |
|---|---|
| Example 1 | 11.4 |
| Example 2 | 3.5 |
| Example 3 | 7.2 |

As can be seen, a very much higher bond performance was achievable in Example 1 than in the two comparative examples, where only part of the elastomers is crosslinked.

The temperature stability of the adhesive tapes was measured by the static peel test, which results are given in Table 2.

TABLE 2

|  | Static T-peel test at 70° C. [mm/h] |
|---|---|
| Example 1 | 13 |
| Example 2 | 32 |
| Example 3 | 15 |

The temperature stability of Examples 1 to 3 is very similar, while in the case of the second example, with a large amount of non-crosslinking elastomer, the temperature stability falls markedly.

The solder bath test was passed by all 3 examples.

What is claimed is:

1. A method of bonding a material selected from the group consisting of plastic parts, electronic components, flexible printed circuits, combinations of electronic components and flexible printed circuits, and polyimide, said method comprising (A) providing a heat-activatable adhesive tape in the form of a sheet and unadhered to said material, thereafter (B) bonding said material with the heat-activatable adhesive tape to form an assembly and thereafter (C) heating the assembly to crosslink the heat-activatable adhesive, wherein the heat-activatable adhesive tape comprises an adhesive comprising the following components:
    a) one or more acid-modified or acid-anhydride-modified vinylaromatic block copolymers having acid or acid-anhydride functional groups; and
    b) one or more epoxidized vinylaromatic block copolymers having epoxide functional groups in an internal polymer block.

2. Method according to claim 1, wherein the vinylaromatic block copolymers of components a) and/or b) are one or more styrene block copolymers.

3. Method according to claim 1, wherein at least one of the block copolymers is hydrogenated in a soft block.

4. Method according to claim 1, wherein the adhesive comprises tackifying resins, accelerators, dyes, carbon black and/or metal powders.

5. Method according to claim 1, wherein the adhesive crosslinks at temperatures above 150° C.

6. Method according to claim 1, wherein the adhesive comprises further elastomers based on pure hydrocarbons, elastomers which are saturated chemically and/or also chemically functionalized hydrocarbons.

7. Method according to claim 1, which further comprises providing the heat-activatable adhesive tape in the form of a sheet and unadhered to said material by coating the adhesive onto a release layer.

8. Method according to claim 1, wherein at least one of components a) and/or b) is composed of polyvinylaromatic-polyolefin block copolymers comprising terminal polyvinylaromatic homopolymer blocks and core polyolefin homopolymer blocks.

9. Method according to claim 8, wherein the polyvinylaromatic homopolymer blocks are polystyrene blocks, and the polyolefin homopolymer blocks are poly-1,3-diene blocks.

10. Method according to claim 9, wherein the poly-1,3-diene blocks are partly, selectively or fully hydrogenated.

11. Method according to claim 1, wherein at least one of the one or more epoxidized vinylaromatic block copolymers is an epoxidized styrene-butadiene-styrene block copolymer.

12. Method according to claim 1, wherein the heat-activatable adhesive tape is in the form of a roll.

13. Method according to claim 1, wherein the heat-activatable adhesive tape consists of heat-activatable adhesive and optionally one or more release liners.

14. Method according to claim 1, wherein the material is a flexible printed circuit board.

* * * * *